(12) United States Patent
Wang

(10) Patent No.: US 9,477,102 B2
(45) Date of Patent: Oct. 25, 2016

(54) METHOD OF PROMOTING BRIGHTNESS UNIFORMITY OF LIQUID CRYSTAL MODULE

(71) Applicant: Shenzhen China Star Optoelectronics Technology Co. Ltd., Shenzhen, Guangdong (CN)

(72) Inventor: Jiangfeng Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 47 days.

(21) Appl. No.: 14/428,965

(22) PCT Filed: Feb. 9, 2015

(86) PCT No.: PCT/CN2015/072479
§ 371 (c)(1),
(2) Date: Mar. 17, 2015

(87) PCT Pub. No.: WO2016/101391
PCT Pub. Date: Jun. 30, 2016

(65) Prior Publication Data
US 2016/0178938 A1 Jun. 23, 2016

(30) Foreign Application Priority Data
Dec. 22, 2014 (CN) .......................... 2014 1 0805879

(51) Int. Cl.
*F23Q 23/08* (2006.01)
*F23Q 23/10* (2006.01)
*G09F 13/04* (2006.01)
*G09F 13/08* (2006.01)
*G02F 1/13* (2006.01)
*F21V 8/00* (2006.01)
*G02B 27/00* (2006.01)

(52) U.S. Cl.
CPC ........... *G02F 1/1309* (2013.01); *G02B 6/0043* (2013.01); *G02B 6/0065* (2013.01); *G02B 27/0012* (2013.01)

(58) Field of Classification Search
CPC .............. G02F 1/1309; G02B 6/0065; G02B 27/0012; G02B 6/0043
See application file for complete search history.

(56) References Cited

U.S. PATENT DOCUMENTS

| 2002/0114152 A1* | 8/2002 | Fujino | G02B 6/0088 362/628 |
| 2003/0086030 A1* | 5/2003 | Taniguchi | G02B 6/005 349/61 |

* cited by examiner

*Primary Examiner* — Donald Raleigh
(74) *Attorney, Agent, or Firm* — Andrew C. Cheng

(57) ABSTRACT

The present invention provides a method of promoting brightness uniformity of a liquid crystal module, comprising steps of: step 1, employing CCD to measure a transmittance distribution of a liquid crystal panel; step 2, calculating an ideal relative brightness distribution of a back light module according to the transmittance distribution of the liquid crystal panel; step 3, manufacturing and optimizing a light guide plate mesh dots structure of the back light module according to the ideal relative brightness distribution of the back light module.

13 Claims, 7 Drawing Sheets

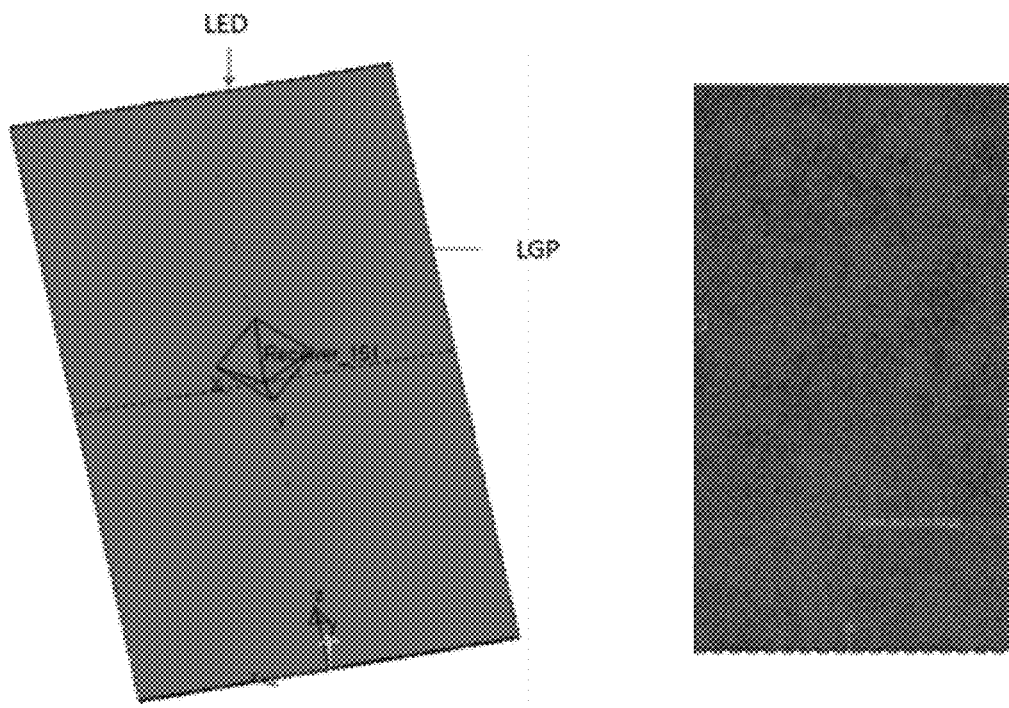
Fig. 7 .8

METHOD OF PROMOTING BRIGHTNESS UNIFORMITY OF LIQUID CRYSTAL MODULE

FIELD OF THE INVENTION

The present invention relates to a display technology field, and more particularly to a method of promoting brightness uniformity of a liquid crystal module.

BACKGROUND OF THE INVENTION

The LCD (Liquid Crystal Display) possesses many advantages of being ultra thin, power saved and radiation free. It has been widely utilized in, such as mobile phones, Personal Digital Assistant (PDAs), digital cameras, laptop screens or notebook screens.

Most of LCDs on the market are back light type LCDs, comprising a Back light module and a liquid crystal panel combined with the Back light module. The working principle of the liquid crystal panel is to locate liquid crystal molecules between two parallel glass substrates, and a plurality of vertical and horizontal tiny electrical wires are between the two glass substrates. The light of back light module is reflected to generate images by applying driving voltages to control whether the liquid crystal molecules to be changed directions. The liquid crystal panel itself does not emit light and needs the back light module to provide light source for normally showing images. The back light modules can be categorized as two types, a side light type back light module and a direct light type back light module according to the difference of the light source incident positions. The side light type back light module is to locate the back light source LED light bar at the back plate edge behind the liquid crystal panel, and the light emitted by the LED light bar enters the LGP (Light Guide Plate) from the incident surface at one side of the light guide plate. After reflection and diffusion, the light goes out from the illuminating surface, and then, a surface light source is formed by the optical film set to provide the same to the liquid crystal panel.

The brightness uniformity of the back light module has great influence to the display uniformity of the liquid crystal module. The brightness uniformity of the back light module is generally defined by a ratio of the brightness minimum and the brightness maximum of 9 points, 13 points or 25 points. When the ratio is larger than some value (such as 80%), the brightness distribution of the back light module reaches the standard or reaches the basic uniformity. Then, the liquid crystal module is assembled with combining the liquid crystal panel. Such design forgets one pint, which the transmittance distribution of the liquid crystal panel is not entirely uniform. As shown in FIG. 1, as the brightness distribution of the back light module 100 is uniform and after combining the liquid crystal panel 200 to assemble the liquid crystal module 300, the brightness of the liquid crystal module 300 is high where the transmittance of the liquid crystal panel 200 is high, and the brightness of the liquid crystal module 300 is low where the transmittance of the liquid crystal panel 200 is low. Therefore, even the back light module 100 is designed to be very uniform, the brightness of the liquid crystal module 300 after combining the liquid crystal panel 200 still has possibility to be non-uniform.

SUMMARY OF THE INVENTION

An objective of the present invention is to provide a method of promoting brightness uniformity of a liquid crystal module, of which the CCD is utilized to measure multiple liquid crystal panel samples, and to count the transmittance distribution of the liquid crystal panels, and the ideal relative brightness distribution of the back light module is calculated according to the transmittance distribution of the liquid crystal panels, and the optical softwares are utilized to design and optimize the light guide plate mesh dots according to the ideal relative brightness distribution of the back light module. Thus, the brightness uniformity of the liquid crystal module can be promoted to raise the grade of the liquid crystal module and to improve the visual sense of the liquid crystal module.

For realizing the aforesaid objective, the present invention provides a method of promoting brightness uniformity of a liquid crystal module, comprising steps of:

step 1, employing CCD to measure a transmittance distribution of a liquid crystal panel;

step 2, calculating an ideal relative brightness distribution of a back light module according to the transmittance distribution of the liquid crystal panel;

step 3, manufacturing and optimizing a light guide plate mesh dot structure of the back light module according to the ideal relative brightness distribution of the back light module.

the transmission part comprises:

step 11, employing CCD to measure a brightness distribution of a liquid crystal module;

step 12, removing the liquid crystal panel in the liquid crystal module and measuring a brightness distribution of the corresponding back light module;

step 13, calculating a transmittance distribution of one liquid crystal panel according to the brightness distribution of the liquid crystal module and the brightness distribution of the back light module;

step 14, measuring the transmittance distributions of multiple liquid crystal panels according to the aforesaid steps and averaging the same to be the transmittance distribution of the liquid crystal panel.

In the step 2, the ideal relative brightness distribution of the back light module is a reciprocal of the transmittance distribution of the liquid crystal panel.

In the step 3, a graphics software is employed to manufacture an original edition light guide plate mesh dots to be imported into an optical simulation software to establish a model, and simulation and optimization are implemented to the light guide plate mesh dots according to the ideal relative brightness distribution of the back light module.

The graphics software is solidworks. The optical simulation software is lighttools.

In the step 13, the transmittance distribution of one liquid crystal panel is a ratio of the brightness distribution of the liquid crystal module and the brightness distribution of the back light module.

In the step 14, an amount of measured liquid crystal panels is larger than 10.

The present invention provides a method of promoting brightness uniformity of a liquid crystal module, comprising steps of:

step 1, employing CCD to measure a transmittance distribution of a liquid crystal panel;

step 2, calculating an ideal relative brightness distribution of a back light module according to the transmittance distribution of the liquid crystal panel;

step 3, manufacturing and optimizing a light guide plate mesh dot structure of the back light module according to the ideal relative brightness distribution of the back light module;

wherein the step 1 comprises:

step 11, employing CCD to measure a brightness distribution of a liquid crystal module;

step 12, removing the liquid crystal panel in the liquid crystal module and measuring a brightness distribution of the corresponding back light module;

step 13, calculating a transmittance distribution of one liquid crystal panel according to the brightness distribution of the liquid crystal module and the brightness distribution of the back light module;

step 14, measuring the transmittance distributions of multiple liquid crystal panels according to the aforesaid steps and averaging the same to be the transmittance distribution of the liquid crystal panel;

wherein in the step 2, the ideal relative brightness distribution of the back light module is a reciprocal of the transmittance distribution of the liquid crystal panel;

wherein in the step 3, a graphics software is employed to manufacture an original edition light guide plate mesh dots to be imported into an optical simulation software to establish a model, and simulation and optimization are implemented to the light guide plate mesh dots according to the ideal relative brightness distribution of the back light module.

The benefits of the present invention are: the present invention provides a method of promoting brightness uniformity of a liquid crystal module, of which the CCD is utilized to measure multiple liquid crystal panel samples, and to count the transmittance distribution of the liquid crystal panels, and the ideal relative brightness distribution of the back light module is calculated according to the transmittance distribution of the liquid crystal panels, and the optical softwares are utilized to design and optimize the light guide plate mesh dots according to the ideal relative brightness distribution of the back light module. Thus, the brightness uniformity of the liquid crystal module can be promoted to raise the grade of the liquid crystal module and to improve the visual sense of the liquid crystal module. The accuracy of the method is high, and the speed is fast. The better effect can be obtained after optimization before the manufacture of the experiment samples. Accordingly, the times of manufacturing samples and verifications can be reduced. The procedure can be effectively simplified and the cost is saved.

BRIEF DESCRIPTION OF THE DRAWINGS

The technical solution and the beneficial effects of the present invention are best understood from the following detailed description with reference to the accompanying figures and embodiments.

In drawings,

FIG. 7 is a model diagram of an original edition light guide plate depicted with a graphics software, solidworks;

FIG. 8 is a model diagram of the light guide plate after the original edition light guide plate in FIG. 7 is imported into an optical simulation software, lighttools;

DETAILED DESCRIPTION OF PREFERRED EMBODIMENTS

For better explaining the technical solution and the effect of the present invention, the present invention will be further described in detail with the accompanying drawings and the specific embodiments.

Figure 1:
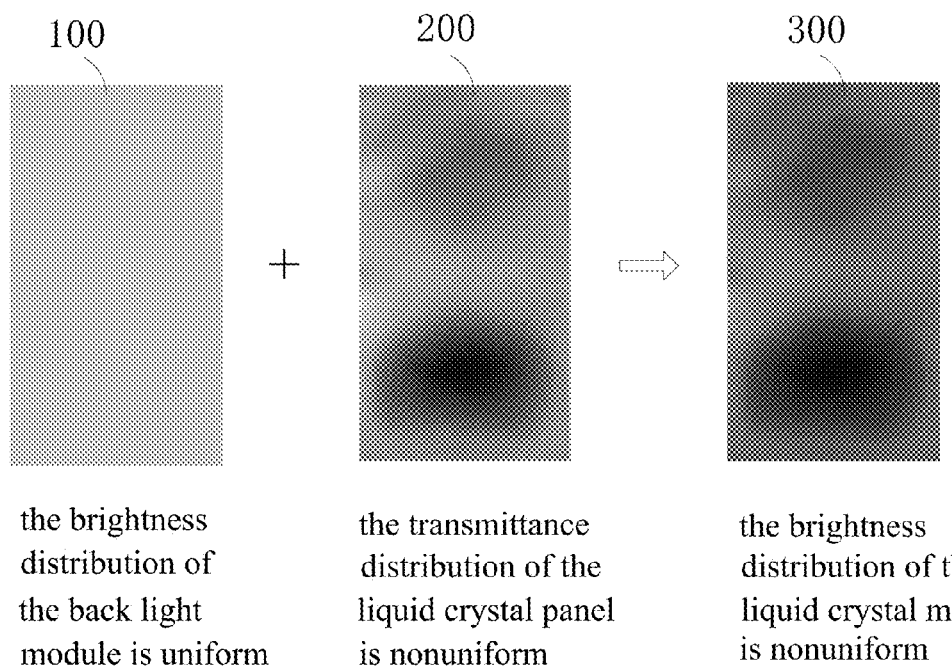
FIG. 1 is a diagram of the nonuniform brightness of liquid crystal module caused by the nonuniform transmittance distribution of the liquid crystal panel according to prior art.
Figure 2:
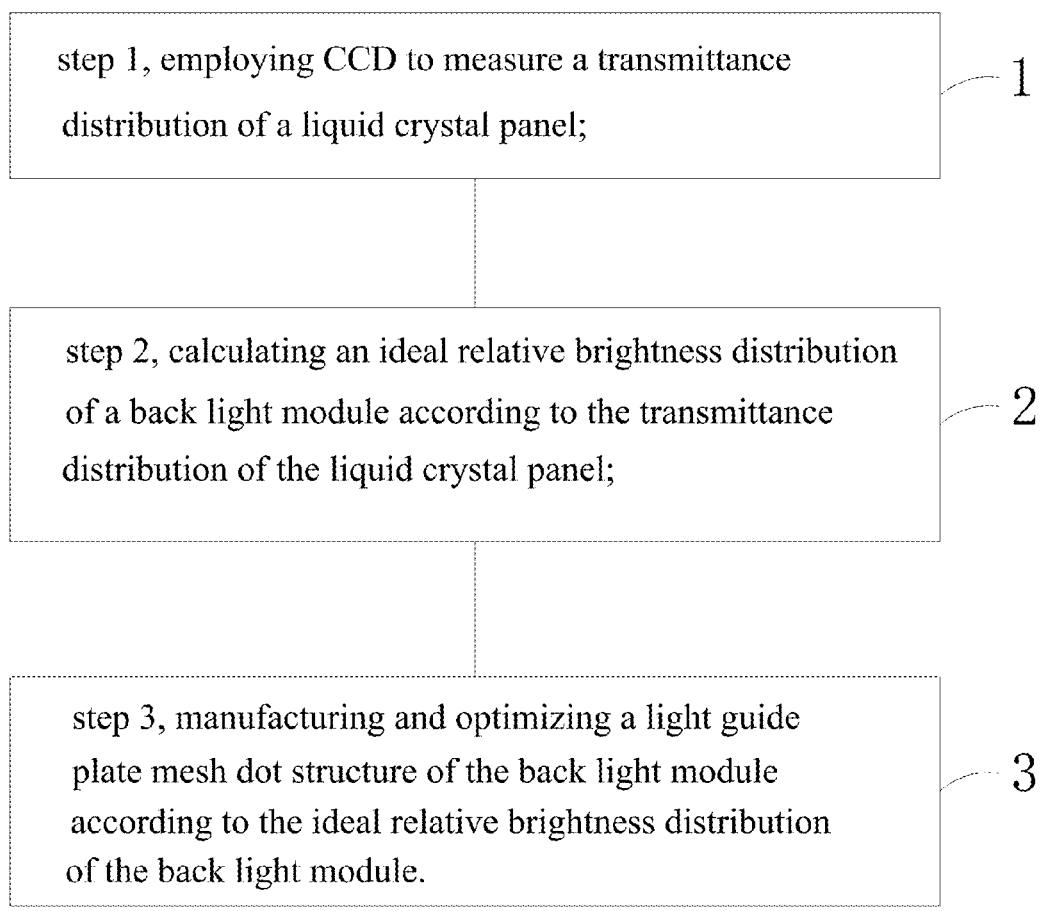
FIG. 2 is a flowchart of a method of promoting brightness uniformity of a liquid crystal module according to the present invention.

Please refer to FIG. 2. The present invention relates to a method of promoting brightness uniformity of a liquid crystal module. The liquid crystal module is a back light type liquid crystal module, comprising a back light module and a liquid crystal panel combined on the back light module.

The back light module is a side light type back light module or a direct light type back light module The liquid crystal panel comprises CF (Color Filter) substrate, a TFT (Thin Film Transistor) substrate, a LC (Liquid Crystal) material sandwiched between the CF substrate and the TFT substrate and sealant.

Figure 3:
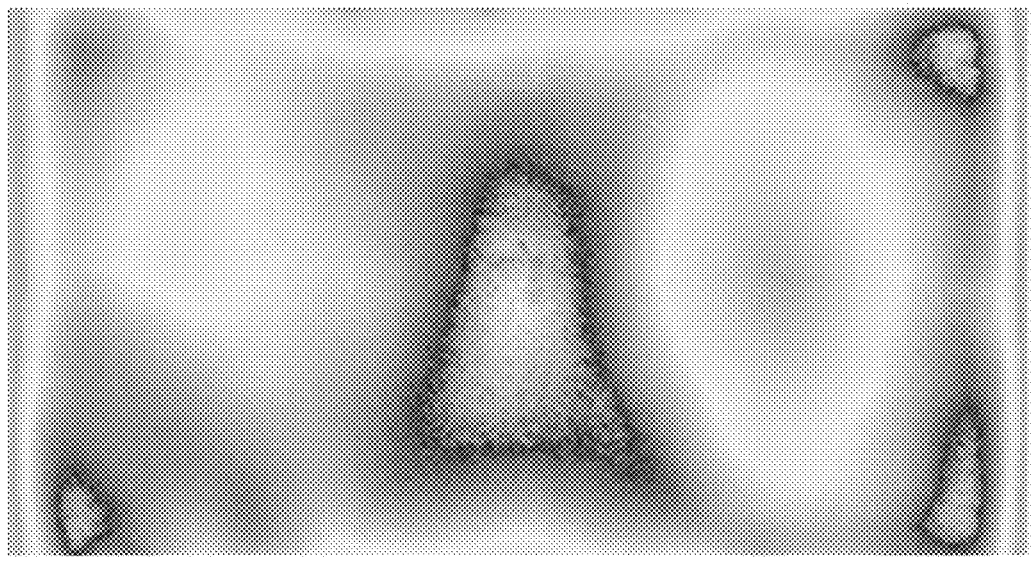
FIG. 3 is a brightness distribution diagram of a liquid crystal module measured in the step 11 with CCD.
Figure 4:
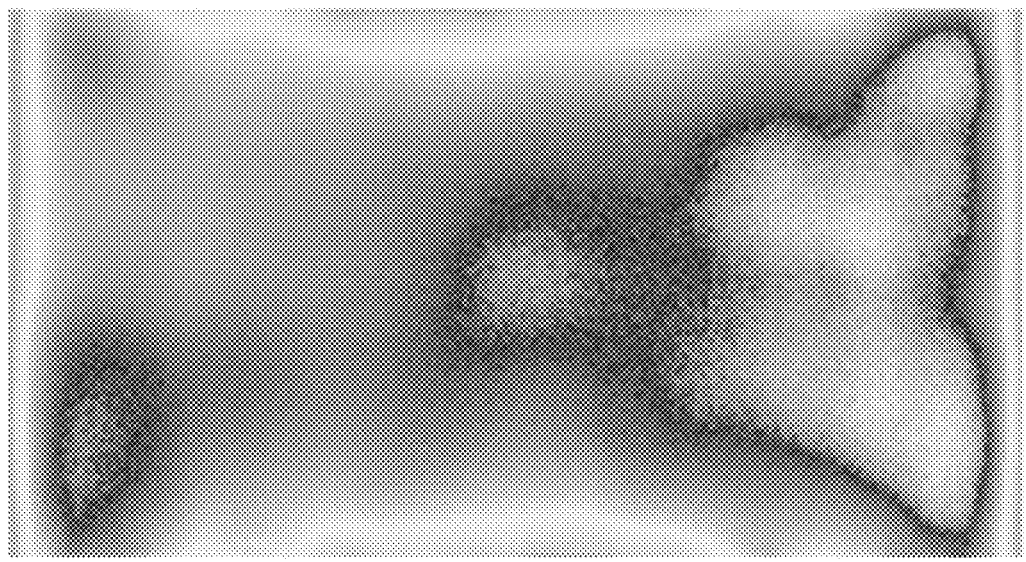
FIG. 4 is a brightness distribution diagram of a back light module measured in the step 12 with CCD.
Figure 5:
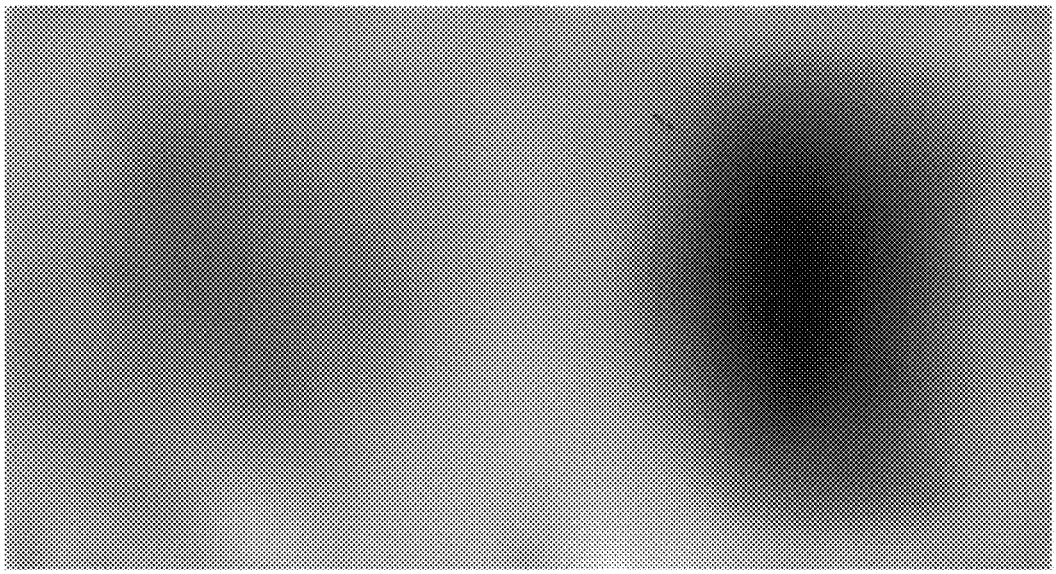
FIG. 5 is a transmittance distribution diagram of a liquid crystal panel obtained in the step 13.

Specifically, the method of promoting brightness uniformity of a liquid crystal module, comprising steps of:

step 1, employing CCD (charge-coupled device) to measure a transmittance distribution of a liquid crystal panel;

Specifically, the step 1 comprises:

step 11, as shown in FIG. 3, employing CCD (charge-coupled device) to measure a brightness distribution Lmodule of a liquid crystal module.

step 12, as shown in FIG. 4, removing the liquid crystal panel in the liquid crystal module and measuring a brightness distribution of the corresponding back light module Lbl;

step 13, as shown in FIG. 5, calculating a transmittance distribution of one liquid crystal panel according to the brightness distribution of the liquid crystal module and the brightness distribution of the back light module.

Furthermore, a ratio of the brightness distribution Lmodule of the liquid crystal module and the brightness distribution Lbl of the back light module is calculated to obtain the transmittance distribution Tr. of one liquid crystal panel, i.e. Tr.=Lmodule/Lbl.

step 14, measuring the transmittance distributions of multiple liquid crystal panels according to the aforesaid steps and averaging the same to be the transmittance distribution of the liquid crystal panel. Generally, different liquid crystal panels vary slightly in brightness distributions. Therefore, it is essential to measure the transmittance distributions of multiple liquid crystal panels, and then averaging the same to be the transmittance distribution of the liquid crystal panel.

Figure 6:
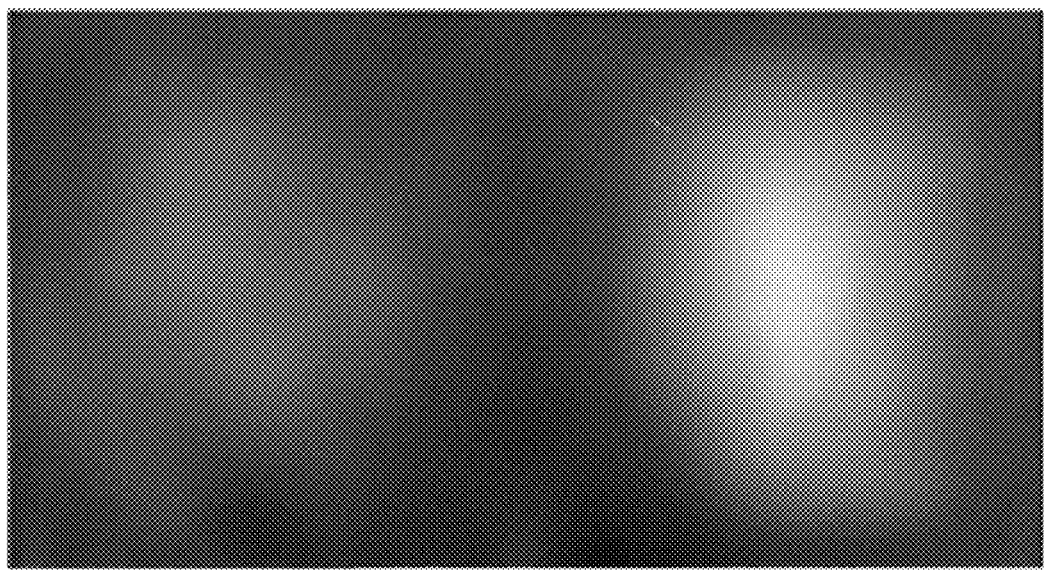
FIG. 6 is an ideal relative brightness distribution diagram of a back light module according to the calculation of the transmittance distribution of the liquid crystal panel obtained in the step 1.

Preferably, in the step 14, an amount of measured liquid crystal panels is larger than 10.

step 2, please refer to FIG. 6, calculating an ideal relative brightness distribution of a back light module according to the transmittance distribution of the liquid crystal panel.

Figure 9:
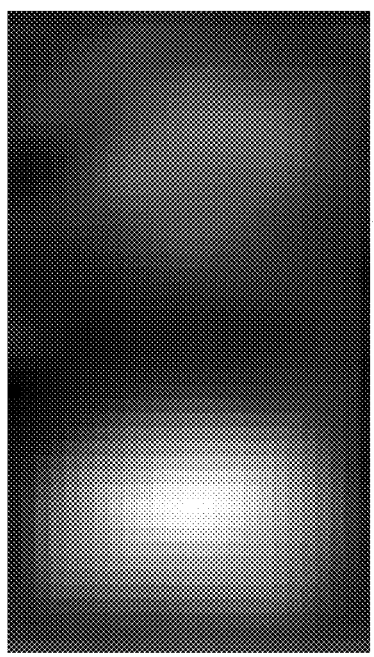
FIG. 9 is an optimization target diagram of the brightness distribution of the illuminating surface of the light guide plate.

Specifically, the ideal relative brightness distribution of the back light module can be a reciprocal of the transmittance distribution of the liquid crystal panel, i.e. 1/Tr.

step 3, as shown in FIGS. 7-9, manufacturing and optimizing a light guide plate mesh dot structure of the back light module according to the ideal relative brightness distribution of the back light module.

Figure 10:
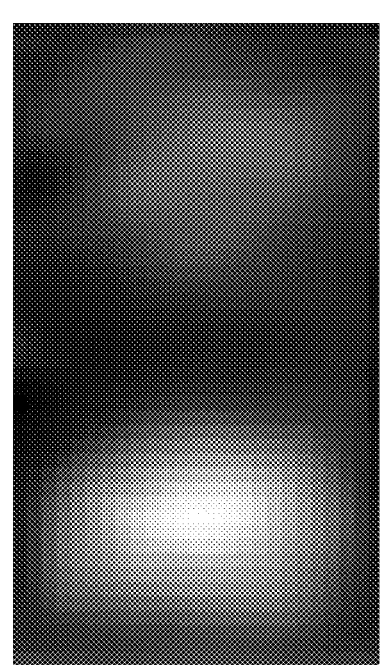
FIG. 10 is a brightness distribution diagram of the illuminating surface of the light guide plate after optimization.
Figure 11:
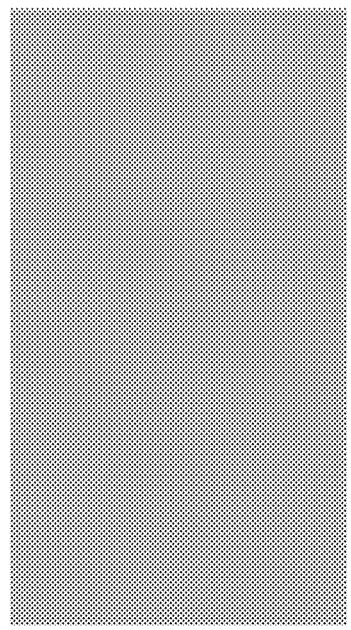
FIG. 11 is a diagram of the brightness uniformity of the liquid crystal module manufactured after the optimization to the light guide plate mesh dots.

Specifically, refer to FIG. 7, and first, a graphics software is employed to manufacture an original edition light guide plate mesh dots to be imported into an optical simulation software to establish a model as shown in FIG. 8, and simulation and optimization are implemented to the light guide plate mesh dots according to the ideal relative brightness distribution of the back light module calculated in the step 2. FIG. 9 and FIG. 10 respectively are an optimization target diagram of the brightness distribution of the illuminating surface of the light guide plate and a brightness distribution diagram of the illuminating surface of the light guide plate after optimization. The light guide plate after optimization is assembled to obtain the back light module after optimization. Then, after being assembled with the corresponding liquid crystal panel, the brightness distribution of the liquid crystal module after optimization is shown in FIG. 11. As shown in FIG. 11, the brightness uniformity of the liquid crystal module after optimization is significantly promoted. Accordingly, the grade and the visual sense of the liquid crystal module are raised.

Preferably, the graphics software can utilize solidworks and the optical simulation software can utilize lighttools.

In conclusion, the present invention provides a method of promoting brightness uniformity of a liquid crystal module, of which the CCD is utilized to measure multiple liquid crystal panel samples, and to count the transmittance distribution of the liquid crystal panels, and the ideal relative brightness distribution of the back light module is calculated according to the transmittance distribution of the liquid crystal panels, and the optical softwares are utilized to design and optimize the light guide plate mesh dots according to the ideal relative brightness distribution of the back light module. Thus, the brightness uniformity of the liquid crystal module can be promoted to raise the grade of the liquid crystal module and to improve the visual sense of the liquid crystal module. The accuracy of the method is high, and the speed is fast. The better effect can be obtained after optimization before the manufacture of the experiment samples. Accordingly, the times of manufacturing samples and verifications can be reduced. The procedure can be effectively simplified and the cost is saved.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A method of promoting brightness uniformity of a liquid crystal module, comprising steps of:
    step 1, employing CCD to measure a transmittance distribution of a liquid crystal panel;
    step 2, calculating an ideal relative brightness distribution of a back light module according to the transmittance distribution of the liquid crystal panel;
    step 3, manufacturing and optimizing a light guide plate mesh dot structure of the back light module according to the ideal relative brightness distribution of the back light module.

2. The method of promoting brightness uniformity of the liquid crystal module according to claim 1, wherein the step 1 comprises:
    step 11, employing CCD to measure a brightness distribution of a liquid crystal module;
    step 12, removing the liquid crystal panel in the liquid crystal module and measuring a brightness distribution of the corresponding back light module;
    step 13, calculating a transmittance distribution of one liquid crystal panel according to the brightness distribution of the liquid crystal module and the brightness distribution of the back light module;
    step 14, measuring the transmittance distributions of multiple liquid crystal panels according to the aforesaid steps and averaging the same to be the transmittance distribution of the liquid crystal panel.

3. The method of promoting brightness uniformity of the liquid crystal module according to claim 1, wherein in the step 2, the ideal relative brightness distribution of the back light module is a reciprocal of the transmittance distribution of the liquid crystal panel.

4. The method of promoting brightness uniformity of the liquid crystal module according to claim 1, wherein in the step 3, a graphics software is employed to manufacture an original edition light guide plate mesh dots to be imported into an optical simulation software to establish a model, and simulation and optimization are implemented to the light guide plate mesh dots according to the ideal relative brightness distribution of the back light module.

5. The method of promoting brightness uniformity of the liquid crystal module according to claim 4, wherein the graphics software is solidworks.

6. The method of promoting brightness uniformity of the liquid crystal module according to claim 4, wherein the optical simulation software is lighttools.

7. The method of promoting brightness uniformity of the liquid crystal module according to claim 2, wherein in the step 13, the transmittance distribution of one liquid crystal panel is a ratio of the brightness distribution of the liquid crystal module and the brightness distribution of the back light module.

8. The method of promoting brightness uniformity of the liquid crystal module according to claim 2, wherein in the step 14, an amount of measured liquid crystal panels is larger than 10.

9. A method of promoting brightness uniformity of a liquid crystal module, comprising steps of:
    step 1, employing CCD to measure a transmittance distribution of a liquid crystal panel;
    step 2, calculating an ideal relative brightness distribution of a back light module according to the transmittance distribution of the liquid crystal panel;
    step 3, manufacturing and optimizing a light guide plate mesh dot structure of the back light module according to the ideal relative brightness distribution of the back light module;
    wherein the step 1 comprises:
    step 11, employing CCD to measure a brightness distribution of a liquid crystal module;
    step 12, removing the liquid crystal panel in the liquid crystal module and measuring a brightness distribution of the corresponding back light module;

step 13, calculating a transmittance distribution of one liquid crystal panel according to the brightness distribution of the liquid crystal module and the brightness distribution of the back light module;

step 14, measuring the transmittance distributions of multiple liquid crystal panels according to the aforesaid steps and averaging the same to be the transmittance distribution of the liquid crystal panel;

wherein in the step 2, the ideal relative brightness distribution of the back light module is a reciprocal of the transmittance distribution of the liquid crystal panel;

wherein in the step 3, a graphics software is employed to manufacture an original edition light guide plate mesh dots to be imported into an optical simulation software to establish a model, and simulation and optimization are implemented to the light guide plate mesh dots according to the ideal relative brightness distribution of the back light module.

10. The method of promoting brightness uniformity of the liquid crystal module according to claim 9, wherein the graphics software is solidworks.

11. The method of promoting brightness uniformity of the liquid crystal module according to claim 9, wherein the optical simulation software is lighttools.

12. The method of promoting brightness uniformity of the liquid crystal module according to claim 9, wherein in the step 13, the transmittance distribution of one liquid crystal panel is a ratio of the brightness distribution of the liquid crystal module and the brightness distribution of the back light module.

13. The method of promoting brightness uniformity of the liquid crystal module according to claim 9, wherein in the step 14, an amount of measured liquid crystal panels is larger than 10.

* * * * *